US012534335B2

(12) United States Patent
Frossard et al.

(10) Patent No.: US 12,534,335 B2
(45) Date of Patent: Jan. 27, 2026

(54) SYSTEM AND METHOD FOR HANDS-FREE OPERATION OF ELEVATOR

(71) Applicant: TECHDAYAFTER INC., Sherwood Park (CA)

(72) Inventors: Regis Frossard, Sherwood Park (CA); Benjamin Le Coent, Poissy (FR)

( * ) Notice: Subject to any disclaimer, the term of this patent is extended or adjusted under 35 U.S.C. 154(b) by 1244 days.

(21) Appl. No.: 17/222,130

(22) Filed: Apr. 5, 2021

(65) Prior Publication Data

US 2021/0347603 A1 Nov. 11, 2021

Related U.S. Application Data

(60) Provisional application No. 63/065,854, filed on Aug. 14, 2020.

(30) Foreign Application Priority Data

May 6, 2020 (WO) ................. PCT/CA2020/050601

(51) Int. Cl.
*B66B 1/34* (2006.01)
*B66B 1/46* (2006.01)
*G06F 3/04886* (2022.01)
*G06F 3/16* (2006.01)

(52) U.S. Cl.
CPC ........... *B66B 1/3461* (2013.01); *B66B 1/468* (2013.01); *G06F 3/04886* (2013.01); *G06F 3/167* (2013.01); *B66B 2201/103* (2013.01); *B66B 2201/4646* (2013.01); *B66B 2201/4653* (2013.01)

(58) Field of Classification Search
CPC . B66B 1/3461; B66B 1/468; B66B 2201/103; B66B 2201/4646; B66B 2201/4653; G06F 3/04886; G06F 3/167; G06F 3/0482; G06F 3/0488
See application file for complete search history.

(56) References Cited

U.S. PATENT DOCUMENTS

| 2017/0270725 A1* | 9/2017 | Troesch ............. G07C 9/00174 |
| 2019/0276275 A1* | 9/2019 | Yang ........................ B66B 1/468 |
| 2021/0045214 A1* | 2/2021 | Pederson ........... H04B 10/1143 |
| 2023/0161443 A1* | 5/2023 | Ziraknejad ............ G06F 3/0443 327/517 |

OTHER PUBLICATIONS

Engineering Guide, Qlicky—Touchless Elevator Journey, 2020, Sebit Company Limited, 16 pp.
Qlicky—Touchless Elevator Journey, 2020, Sebit Company Limited, 4pp.

* cited by examiner

*Primary Examiner* — Hoang M Nguyen
(74) *Attorney, Agent, or Firm* — James A. Sheridan; Sheridan Law, LLC

(57) ABSTRACT

A system and method is presented for hands-free operation of elevator using a smart phone or like device to display one or more colours that are read by a colour-detection device mounted in an elevator cabin and at each elevator landing. Different colours can be displayed by the smart phone or like device and detected by the colour-detection device where different can represent different commands to operate the elevator.

18 Claims, 16 Drawing Sheets

Basic schematic for elevator cabin (up to 40 floors) and for landing floor
For more than 1 floor, replicate relay connexions to corresponding outputs per floor

SYSTEM AND METHOD FOR HANDS-FREE OPERATION OF ELEVATOR

CROSS-REFERENCE TO RELATED APPLICATIONS

This application claims priority of International patent application no. PCT/CA2020/050601 filed 6 May 2020 and of U.S. provisional patent application Ser. No. 63/065,854 filed Aug. 14, 2020, both of which are incorporated by reference into this application in their entirety.

TECHNICAL FIELD

The present disclosure is related to the field of hands-free operation of elevators, in particular, systems and methods using colour-detection techniques for providing commands to elevators.

BACKGROUND

Due to the world-wide threat of virus outbreak, such as Covid19, contactless operation of elevators and the like will become a new standard for health, safety and hygiene purposes. People operating an elevator, currently, must touch buttons on the control panels located at elevator landings and in elevator cabins to either call an elevator or to select their desired floor, in addition to other buttons on the elevator control panel, which potentially become a vector of transmission of infection of a virus.

It is known to use visual codes displayed on a smart device, such as an iPhone®, iPad® or like device as a means to represent data that can be read by an optical reading device. Such codes can include QR® codes. QR® codes can use patterns to embed data that can be displayed on the smart device. The problem with the use of QR® codes on a smart device is that if there are cracks on the display of the smart device, a QR® code reader cannot decode the data from the displayed code. In some instances, the QR® code reader will proceed to a scan error analysis, which can result in the read codes not matching. The reason for this is that the QR® code reader uses a laser to read a displayed code. Reading a displayed code on a damaged screen of a smart device, the cracked screen display can cause reading errors due to refraction of the laser light caused by the cracks. As a result, the accuracy of reading a QR® code off a smart device with a cracked display is less than 100%.

It is, therefore, desirable to provide a system and method that overcomes the problems of prior art technology and enables hands-free operation of elevators and like means of transportation.

SUMMARY

In some embodiments, a system and method can be provided for hands-free operation of an elevator and other like means of transportation. In some embodiments, the system can comprise a smart device, such as a smart phone (iPhone®, iPad®, Android® device), smart watch or other like device operating an application that can generate a plurality of colours to be displayed on the device's display screen where the plurality of colours that represents information relating to a command that can be entered on the elevator's control panel. The displayed colours can be detected by a colour detector mounted adjacent to an elevator control and then interpreted by a microcontroller. The outputs of the microcontroller can then be connected to a relay board, or other like control board, operatively connected to the buttons of the elevator's control panel. These connections allow us to generate an electrical signal and, therefore, simulate the signal of button pressing.

The control board can comprise the control panel located within an elevator cabin to select a floor to travel to or it can comprise the control panel located at an elevator landing to call an elevator to travel up or down, as the case may be. The smart device application can comprise a virtual keyboard to enable a user to enter an elevator command, such as selecting a floor to travel to. By entering in the desired floor number on the virtual keyboard, the application can generate a unique combination of colours that can be shown to and detected by the colour detector and then interpreted by the microcontroller to then operate the relay control for the desired floor number. The combination of colours read can be decoded and can then trigger an output of the microcontroller which will trigger a relay and then simulate the signal of an elevator button being pressed.

The elevator control board can, thus, operate as if someone manually pressed the desired floor's button on the elevator's control panel. In addition to providing means to select a desired floor, the system can also generate signals or commands for operating other elevator functions such open or close doors, up or down buttons, alarm buttons, operate intercom buttons, as well as any other elevator operation or function as well known to those skilled in the art.

In some embodiments, the colours detection system can allow the detection of colours anywhere in a smart phone display so that if even there are cracks on the screen, the colour detector can still detect the colours displayed on the smart system.

In some embodiments, a method can be provided to associate a combination of colours to a particular button on an elevator control panel, such as a floor number, an alarm, an open or close control button and the like.

In some embodiments, the system can assign a floor (or other elevator function) to a combination of colours, and then convert this combination of colours into an electrical signal. In some embodiments, seven base colours can be used which can be selected to differ from each other in term of hue, saturation and luminance. Those selected values mentioned below have been successfully detected via the colour sensor in an elevator lighting environment. In some embodiments, other base colours could also be used.

In some embodiments, the system and method can implement the following colour scheme:
  colour 1: "salmon [hexadecimal #ffba8b]" RGB(255,186,139)
  colour 2: "dark blue [hexadecimal #323cff]" RGB(50,60,255)
  colour 3: "orange [hexadecimal #ffaa33]" RGB(255,170,51)
  colour 4: "red [hexadecimal #ed2f36]" RGB(237,47,54)
  colour 5: "green [hexadecimal #21b04c]" RGB(33,176,76)
  colour 6: "light blue [hexadecimal #2dd7e0]" RGB(45,215,224)
  colour 7: "pink [hexadecimal #ff33ff]" RGB(255,51,255)

In some embodiments, a combination of colours can be assigned, as opposed to a single colour, to a particular floor button (or other button function) as commercially available colour sensors are not able to detect more than 100 colours accurately.

Currently, the tallest building in the world, the Burj Khalifa in Dubai, has a double deck elevator that goes up to the 124th floor.

In some embodiments, the combination of colours for a particular elevator function can be unique in any orientation. For example, if one floor has colours 1-2-3-4 as its unique combination of colours, another floor can not have colours 4-3-2-1 as combination of colours too avoid any errors.

In some embodiments, the colour combinations can not have 2 consecutive similar colours. For example, colours 1-2-1-2 can be used but colours 1-1-2-3 can not be used.

In some embodiments, the number of combinations colours can be a minimum of 127 and more to accommodate future high-rise buildings.

In some embodiments, a combination of 4 colours can be used as 4 is the smallest number of colours that can address the constraints mentioned above. The use of 4 colour can provide the following number of unique combinations: (7×6×6×6)/2 combinations, which is equal to 756.

In some embodiments, any one of the 7 colours can be used for the first colour in our combination of colours, then 6 choices for the second colour, then 6 choices for the third colour and, lastly, 6 choices for the fourth colour. The total is then divided by 2 at the end for removing the reverse combinations. For example, colours 1-2-3-4 and 4-3-2-1 count for 1 combination.

In other embodiments, a sequence of 4 colours could be displayed, one at a time, one by one for a certain amount of time, in order to make sure that the colour sensor catches the sequence. The principles are the same as the combination of colours mentioned above. In such embodiments, reading and catching an entire sequences in the appropriate order would be required and even if the colour sensor starts to read in the middle of a sequence. In some embodiments, the number of combinations can be: (7*6*6*6)/4 combinations, which is equal to 378. The total shall be divided by 4 at the end for removing the reverse combinations and similar combinations. For example, colours 1-2-3-4, 2-3-4-1, 3-4-1-2, 4-1-2-3 would count for 1 combination.

Broadly stated, in some embodiments, a system can be provided for hands-free control of a control panel of an elevator or like transportation means, the system comprising: a colour detector configured for detecting a unique colour code comprised of a plurality of colours, the colour detector further configured to generate a first signal in response to the colour detector detecting the unique colour code; a microcontroller operatively coupled to the colour detector, the microcontroller configured to receive and decode the first signal to generate a predetermined output signal in response to the unique colour code, the microcontroller further configured to generate a plurality of unique predetermined output signals, one for each of the unique combination of the plurality of colours; and a plurality of relays operatively coupled to the microcontroller, wherein the system further comprises at least one relay for each of the plurality of the unique output signals, each of the plurality of relays configured to be operatively coupled to at least one button disposed on the control panel.

Broadly stated, in some embodiments, the system can further comprise an indicator configured for providing an acknowledgement when the microcontroller has decoded the unique colour code.

Broadly stated, in some embodiments, the indicator can comprise one or both of a visual indicator and an audible indicator.

Broadly stated, in some embodiments, the microcontroller can comprise an in-circuit serial programmer ("ICSP") header and wherein the colour detector is operatively coupled to the ICSP header.

Broadly stated, in some embodiments, the system can further comprise at least one shift register operatively coupled to the microcontroller, wherein the at least one shift register is disposed between the microcontroller and at least one of the plurality of relay boards.

Broadly stated, in some embodiments, the system can further comprise a printed card comprising the unique colour code printed thereon.

Broadly stated, in some embodiments, the system can further comprise a smart device configured to display the unique colour code on a touchscreen display disposed on the smart device.

Broadly stated, in some embodiments, the smart device can comprise a software application operatively disposed in a memory disposed therein, the software application comprising: a first code segment configured for displaying a virtual keyboard on the touchscreen display; a second code segment configured for detecting a key depressed on the virtual keyboard; a third code segment configured for looking up the unique colour code corresponding to the depressed key in a colour table disposed in a memory disposed on the smart device, the colour table comprising a plurality of colour codes; and a fourth code segment configured for displaying the unique colour code corresponding to the depressed key on the touchscreen display.

Broadly stated, in some embodiments, the software application can further comprise: a fifth code segment configured for enabling the software application to respond to vocal commands; a sixth code segment configured for enabling a microphone disposed on the smart device to respond to a vocal command; a seventh code segment configured for detecting at least one word spoken in the vocal command; an eighth code segment configured for searching for the detected at least one word in a word table disposed in the memory; and a ninth code segment configured for displaying the unique colour code corresponding to the detected at least one word on the touchscreen display if the detected at least one word is located in the word table.

Broadly stated, in some embodiments, the software application can further comprise a tenth code segment configured to determine where the elevator or like transportation means is located using a global positioning system disposed in the smart device.

Broadly stated, in some embodiments, a method can be provided for hands-free control of a control panel of an elevator or like transportation means, the method comprising: displaying a unique colour code of a plurality of colours to a colour detector; generating a first signal in response to the unique colour code; decoding the unique colour code to generate a unique predetermined output signal; and operating a relay in response to the unique predetermined output signal, the relay corresponding to the unique predetermined output signal, the relay operatively coupled to a button disposed on the control panel, the button corresponding to the unique predetermined output signal.

Broadly stated, in some embodiments, the method can further comprise providing an acknowledgement when the unique colour code has been decoded.

Broadly stated, in some embodiments, the acknowledgement can comprise one or both of a visual indicator and an audible indicator.

Broadly stated, in some embodiments, the method can further comprise displaying the unique colour code with a printed card comprising the unique colour code printed thereon.

Broadly stated, in some embodiments, the method can further comprise displaying the unique colour code with a smart device configured to display the unique colour code on a touchscreen display disposed on the smart device.

Broadly stated, in some embodiments, the method can further comprise: displaying a virtual keyboard on the touchscreen display; depressing a key on the virtual keyboard; looking up the unique colour code corresponding to the depressed key in a colour table; and displaying the unique colour code corresponding to the depressed key on the touchscreen display.

Broadly stated, in some embodiments, the method can further comprise: enabling the smart device to receive vocal commands; detecting at least one word spoken in a vocal command using a microphone disposed on the smart device; searching for the detected at least one word in a word table; and displaying the unique colour code corresponding to the detected at least one word on the touchscreen display if the detected at least one word is located in the word table.

Broadly stated, in some embodiments, the method can further comprise determining the location of the elevator or like transportation means using a global positioning system disposed in the smart device.

Broadly stated, in some embodiments, a system can be provided for hands-free control of a control panel of an elevator or like transportation means, the system comprising: means for displaying a unique colour code of a plurality of colours to a colour detector; means for generating a first signal in response to the unique colour code; means for decoding the unique colour code to generate a unique predetermined output signal; and means for operating a relay in response to the unique predetermined output signal, the relay corresponding to the unique predetermined output signal, the relay operatively coupled to a button disposed on the control panel, the button corresponding to the unique predetermined output signal.

Broadly stated, in some embodiments, the system can further comprise means for providing an acknowledgement when the unique colour code has been decoded.

Broadly stated, in some embodiments, the acknowledgement can comprise one or both of a visual indicator and an audible indicator.

Broadly stated, in some embodiments, the system can further comprise a printed card comprising the unique colour code printed thereon.

Broadly stated, in some embodiments, the system can further comprise means for displaying the unique colour code on a touchscreen display.

Broadly stated, in some embodiments, the system can further comprise: means for displaying a virtual keyboard on the touchscreen display; means for depressing a key on the virtual keyboard; means for looking up the unique colour code corresponding to the depressed key in a colour table; and means for displaying the unique colour code corresponding to the depressed key on the touchscreen display.

Broadly stated, in some embodiments, the system can further comprise: means for enabling the smart device to receive vocal commands; means for detecting at least one word spoken in a vocal command using a microphone; means for searching for the detected at least one word in a word table; and means for displaying the unique colour code corresponding to the detected at least one word on the touchscreen display if the detected at least one word is located in the word table.

Broadly stated, in some embodiments, the system can further comprise means for determining the location of the elevator or like transportation means.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

Figure 1A:
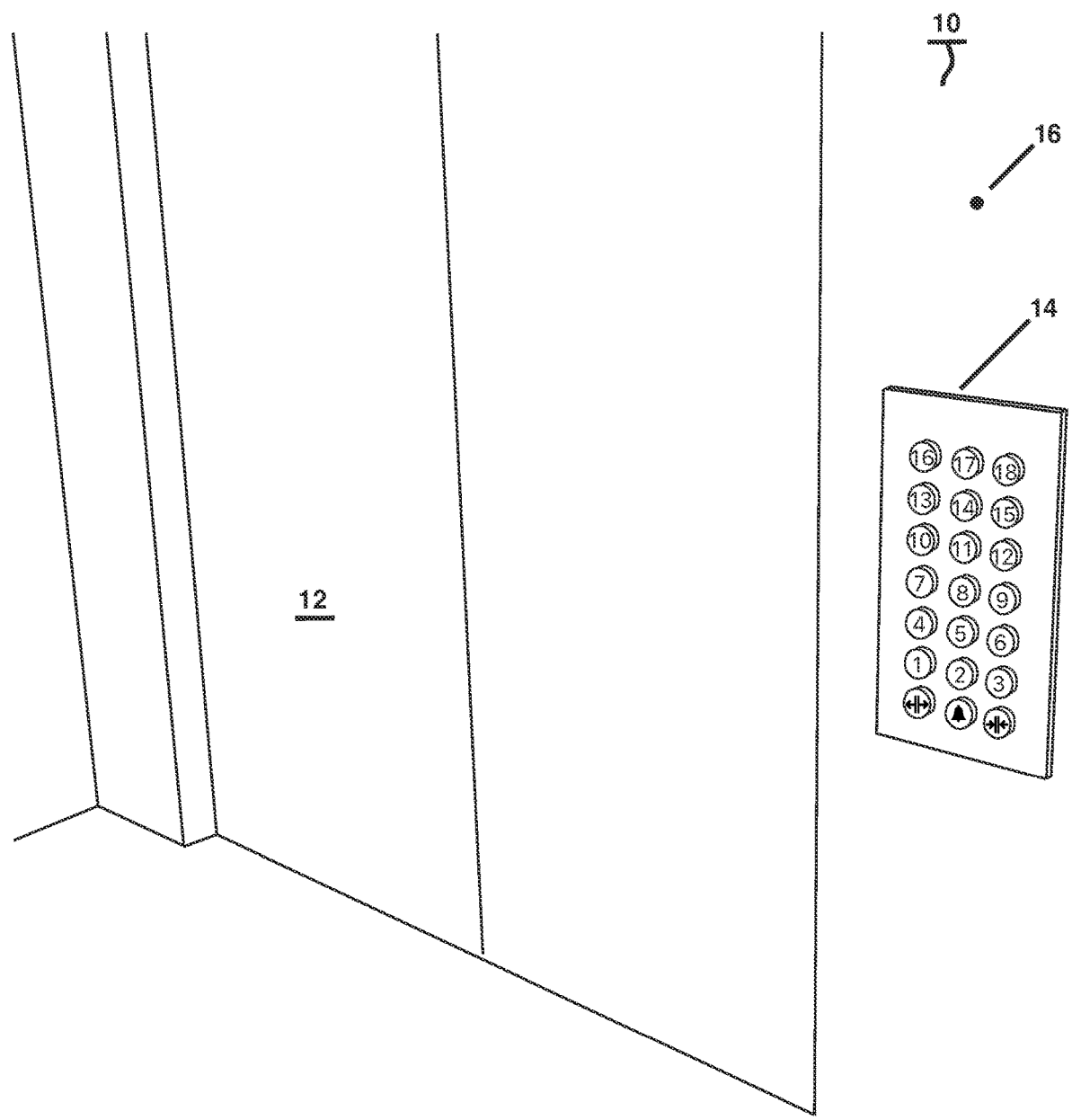
FIG. 1A is a perspective view depicting one embodiment of a colour-detection system disposed in an elevator cabin.
Figure 3:
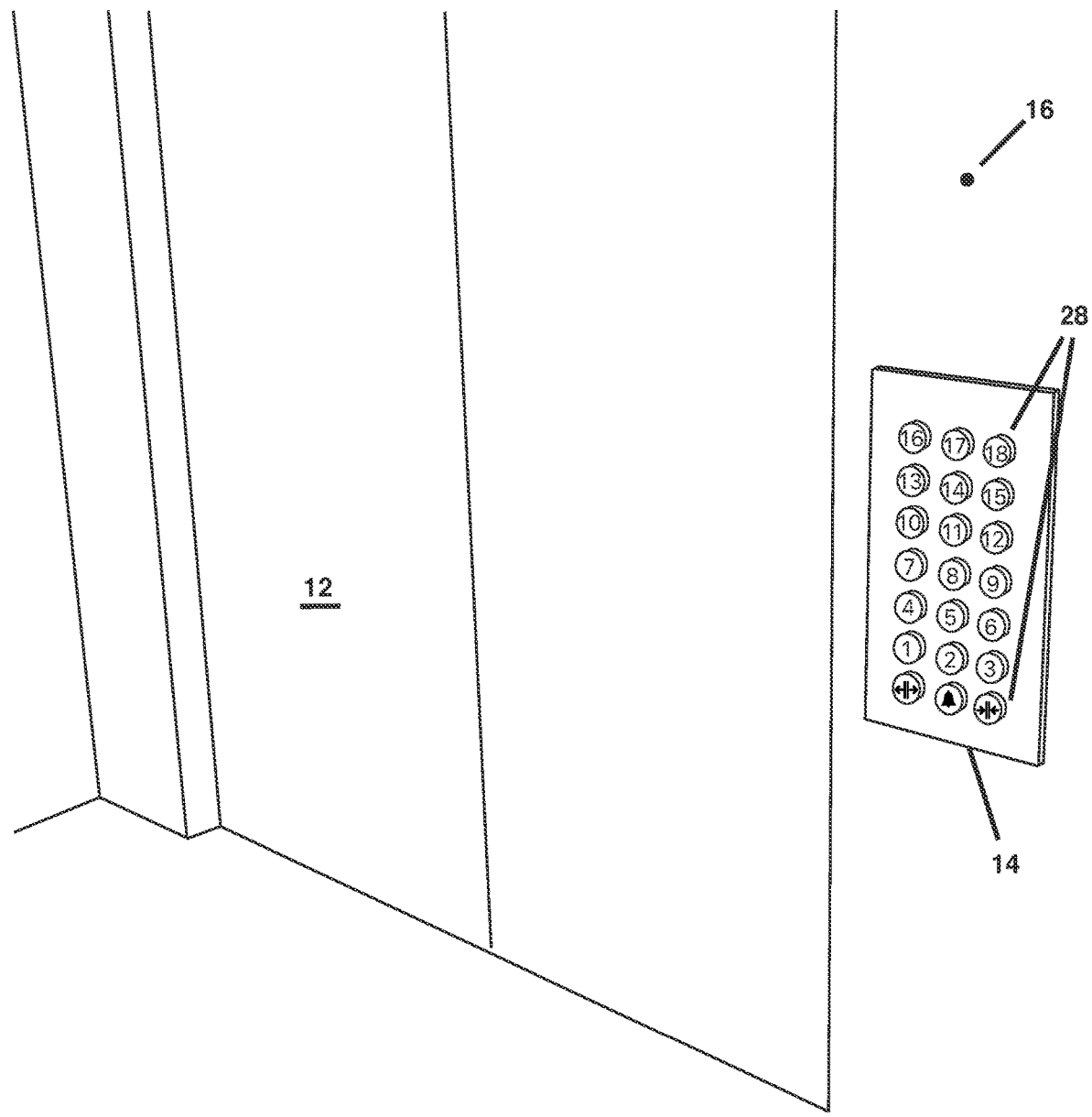
FIG. 3 is a perspective view depicting a control panel for operating the elevator of FIG. 1A.

A system and method for hands-free operation of an elevator or like means of transportation is provided. Referring to FIGS. 1A and 3, one embodiment elevator cabin 12 is shown. In some embodiments, elevator cabin 12 can comprise of control panel 14 disposed on an interior wall thereof, further comprising a plurality of buttons 28 disposed thereon to provide means to select a floor to travel to by pressing the desired floor numbered button, as well known to those skilled in the art, in addition to buttons 14 designated for opening or closing the elevator doors, to initiate an alarm, to activate an intercom among other functions available on an elevator control panel. In some embodiments, elevator cabin 12 can further comprise colour sensor or detector 16 disposed near control panel 14 for use with hands-free control system 10. In some embodiments, colour detector 16 can comprise a model CMUcam5 camera module as jointly manufactured by Charmed Labs of Austin, Texas, USA and Carnegie Mellon University of Pittsburgh, Pennsylvania, USA.

Figure 1B:
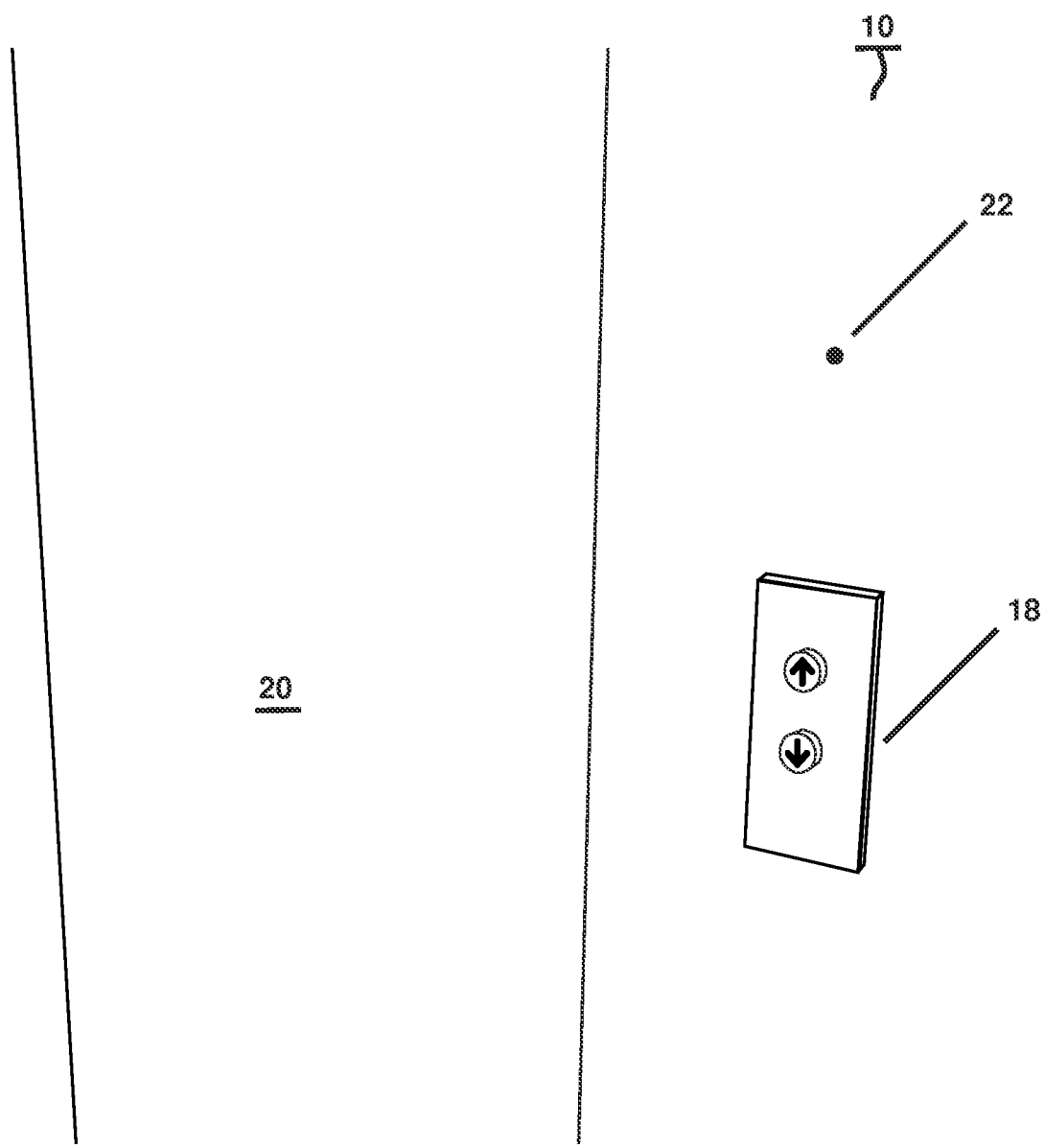
FIG. 1B is a perspective view depicting one embodiment of a colour-detection system disposed on an elevator landing.
Figure 2:
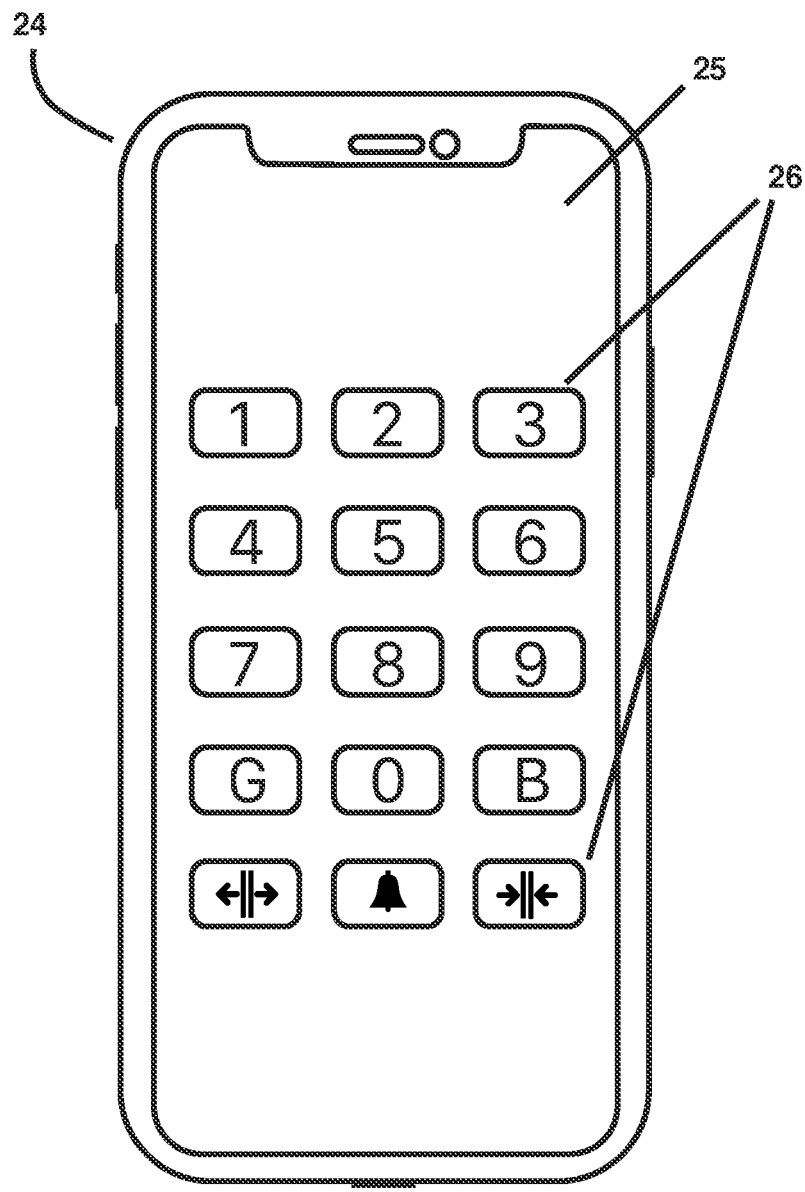
FIG. 2 is a top plan view depicting one embodiment of a virtual keyboard operating on a smart phone for use with the system of FIGS. 1A and 1B.
Figure 4:
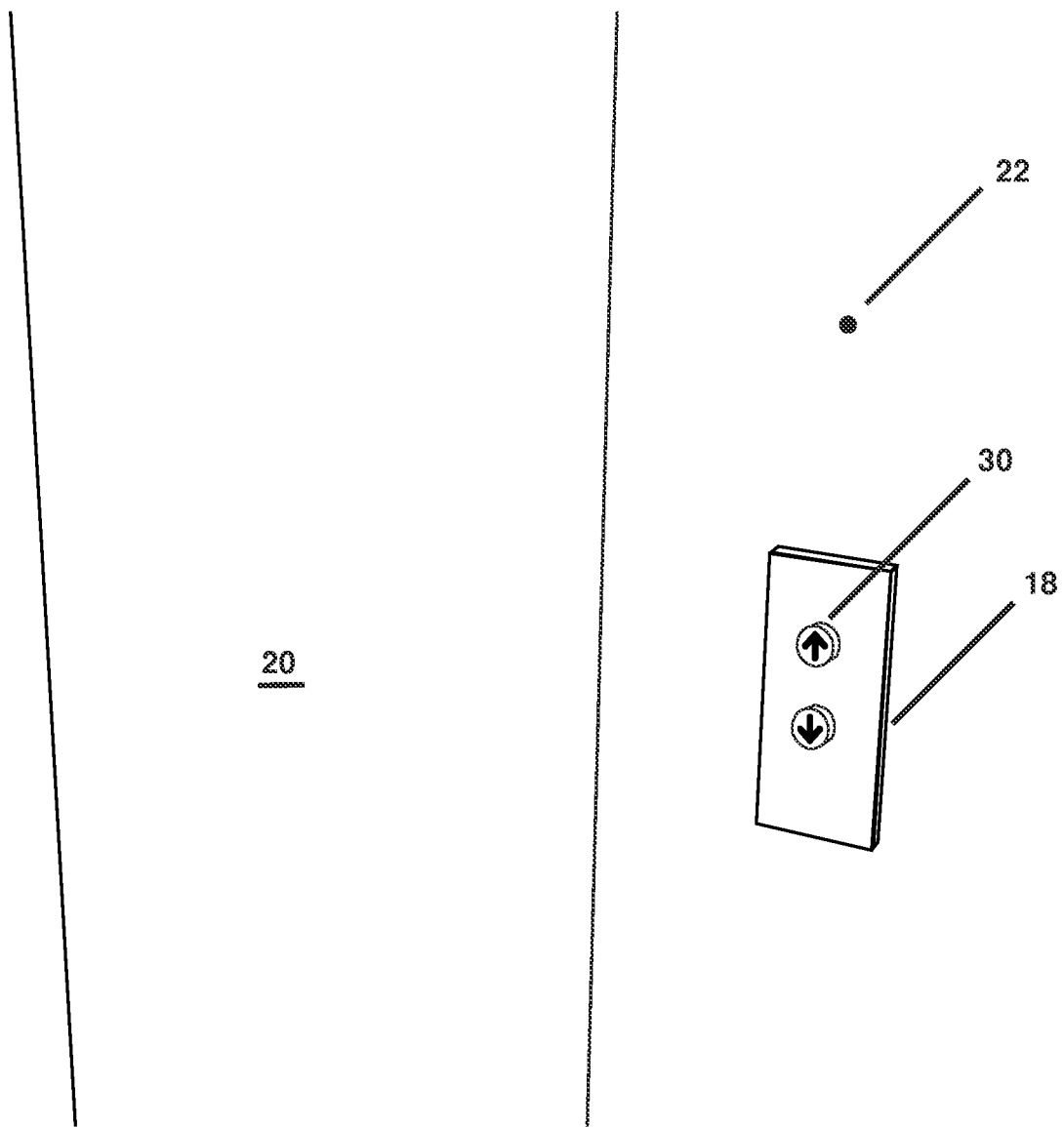
FIG. 4 is a perspective view depicting a control panel for operating the elevator of FIG. 1B.
Figure 5:
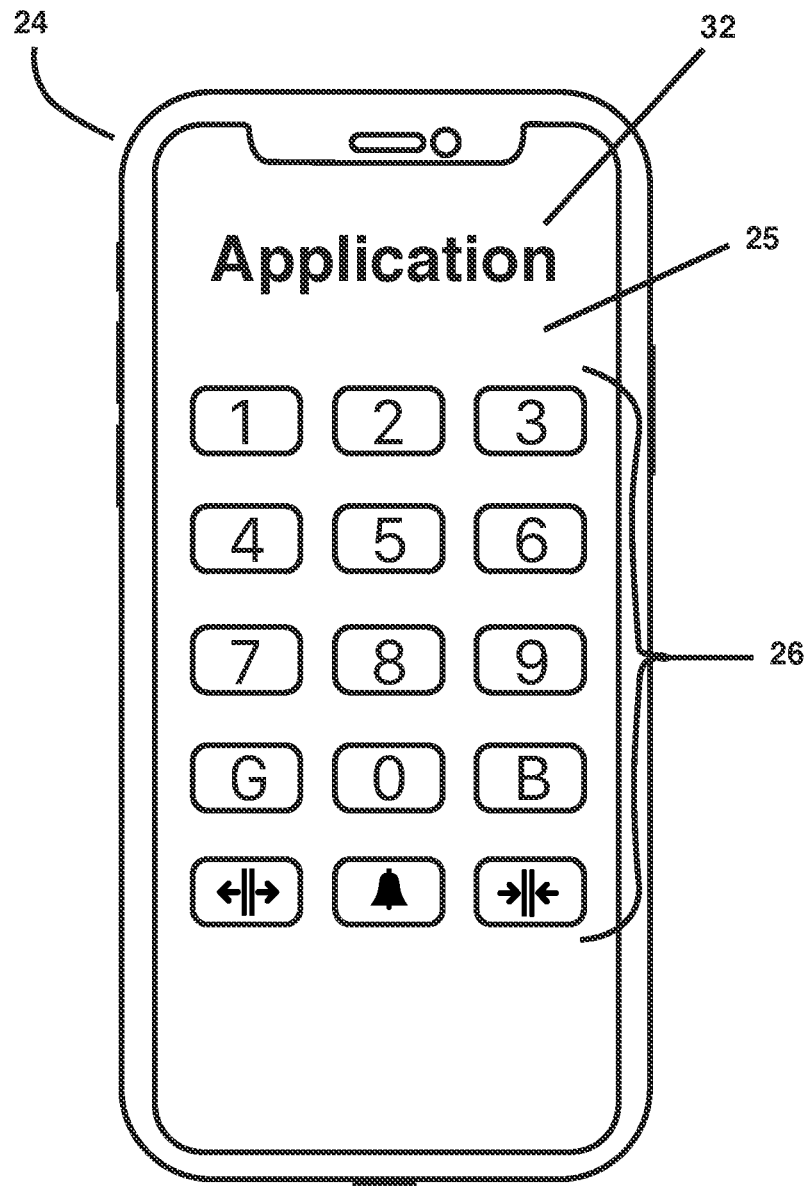
FIG. 5 is a top plan view depicting one embodiment of a software application operating on a smart phone for use with the system of FIGS. 1A and 1B.

Referring to FIGS. 1B and 4, one embodiment of elevator landing 20 is shown, wherein elevator landing 20 can be located at ground level or any floor within a building where access to the elevator is provided. In some embodiments, elevator landing 20 can comprise of control panel 18 disposed on a wall surface adjacent to the elevator's doors, further comprising a plurality of buttons 30 disposed thereon to provide means to call an elevator to travel upwards or downwards, as well known to those skilled in the art. In some embodiments, elevator landing 20 can further comprise colour sensor or detector 22 disposed near control panel 18 for use with hands-free control system 10. In some embodiments, colour detector 22 can comprise a model CMUcam5 camera module as jointly manufactured by Charmed Labs of Austin, Texas, USA and Carnegie Mellon University of Pittsburgh, Pennsylvania, USA. Referring to FIGS. 2 and 5, one embodiment of smart device 24 is shown for use with control system 10. In some embodiments, smart device 24 can comprise any of devices such as smartphones (iPhone®, Android®, Windows® phones and the like), smart watches and tablets (iPad®, for example). In some embodiments, smart device 24 can comprise touchscreen display 25 that can further display virtual keyboard 26 to allow a user to input commands and data to smart device 24 by pressing the virtual buttons of virtual keyboard 26. In some embodiments, smart device 24 can comprise software application 32 operatively operating thereon for use with control system 10.

Figure 6:
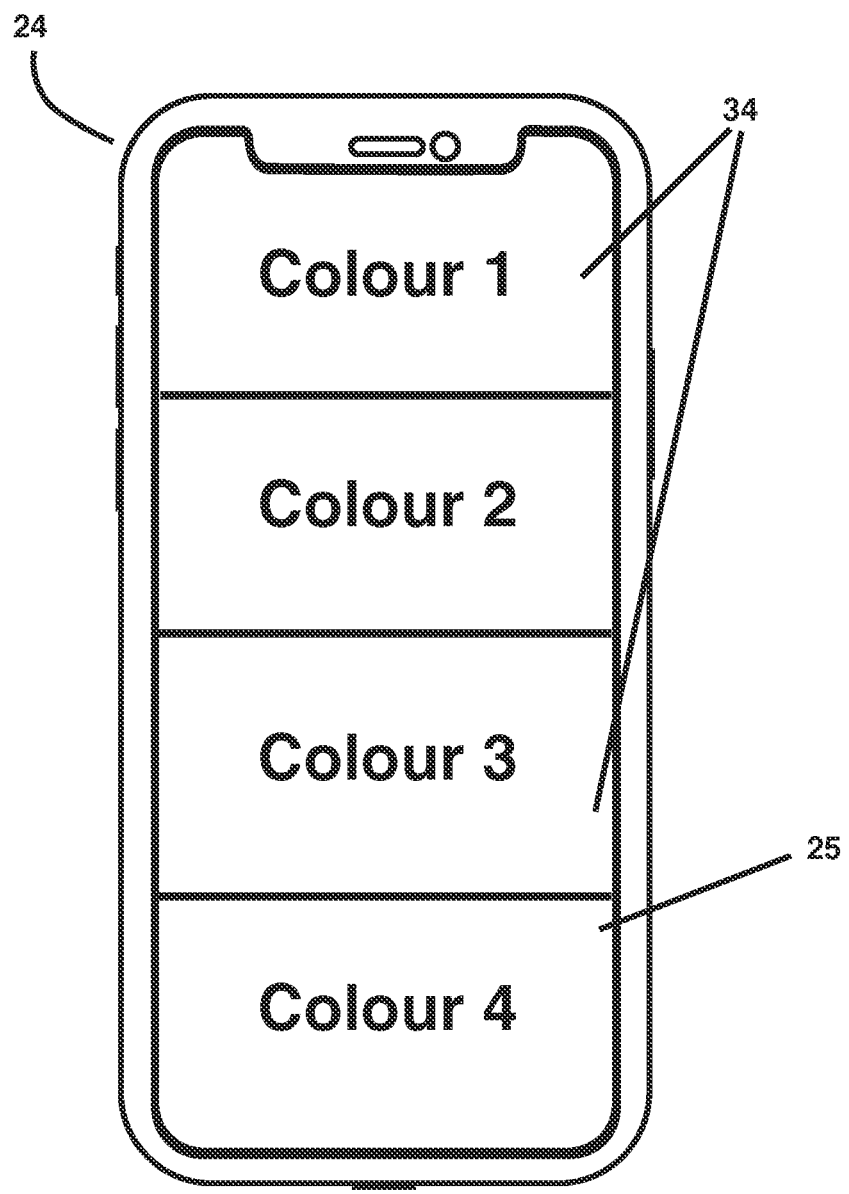
FIG. 6 is a top plan view depicting a smart phone displaying a plurality of colours for use with the system of FIGS. 1A and 1B.

In some embodiments, a user can interact with application 32 to enter a desired floor number by typing the floor number on virtual keyboard 26. Application 32 can then generate a unique colour code for the desired floor and then display unique colour code 34 on touchscreen display 25, as shown in FIG. 6. Displayed unique colour code 34 can then be displayed to colour sensor 16 in elevator cabin 12, or to colour sensor 22 at elevator landing 20, as the case may be, to operate the elevator accordingly. Other function buttons, as present on control panel 14, can also be presented on touchscreen display 25 for the user to operate as desired. Each separate floor and each separate function or control button on control panel 14 can have a corresponding different and unique colour code. As discussed above, colour code 34 can comprise a plurality of different colours. In a representative embodiment, colour code 34 can comprise of 4 different colours although fewer or more colours can be used.

Figure 7:
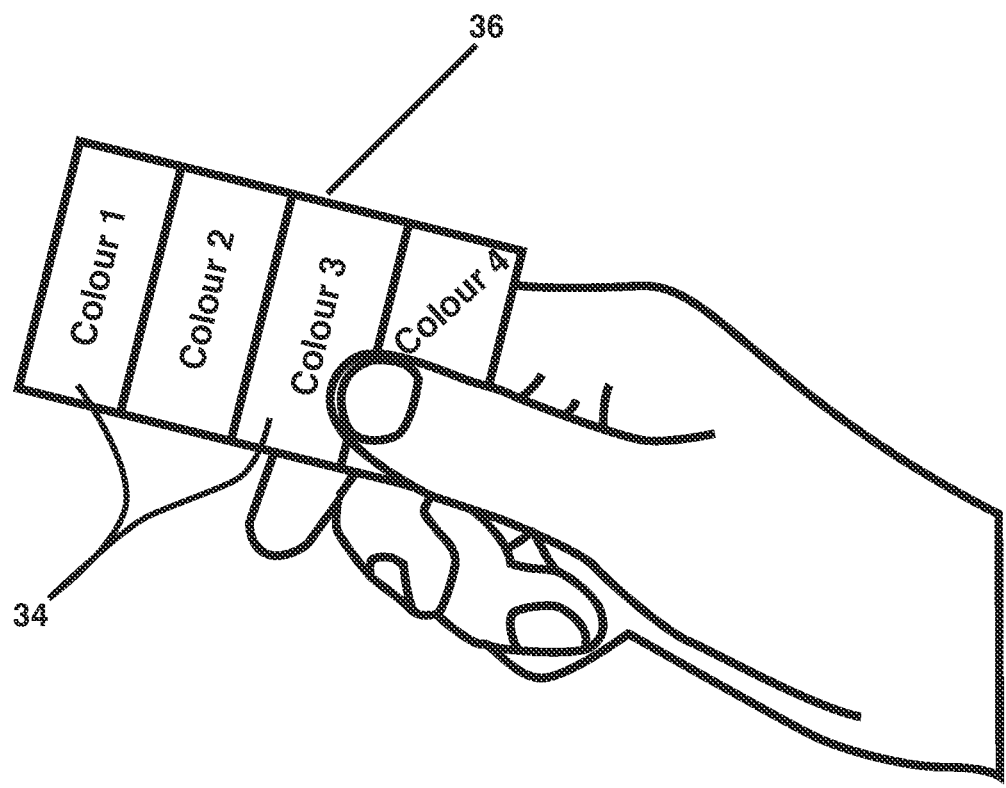
FIG. 7 is a perspective view depicting one embodiment of a printed card displaying a plurality of colours for use with the system of FIGS. 1A and 1B.

In some embodiments, a pre-printed card 36, as shown in FIG. 7, can be used in place of smart device 24, wherein card 36 can comprise colour code 34 printed thereon to be presented to colour sensor 16 or 22, as the case may be, to operate control system 10. Possible uses of card 36 can include courtesy cards issued to visitors by the reception, information centre or security staff of the building, office building, hotel, residential building, shopping mall or other structure as a means to gain access to a particular floor in the structure via an elevator. Card 36 can also be given to visitors who do not have any devices such as smartphones, smart watches or tablets. They can keep card 36 with them during their stay in the building.

Figure 8:
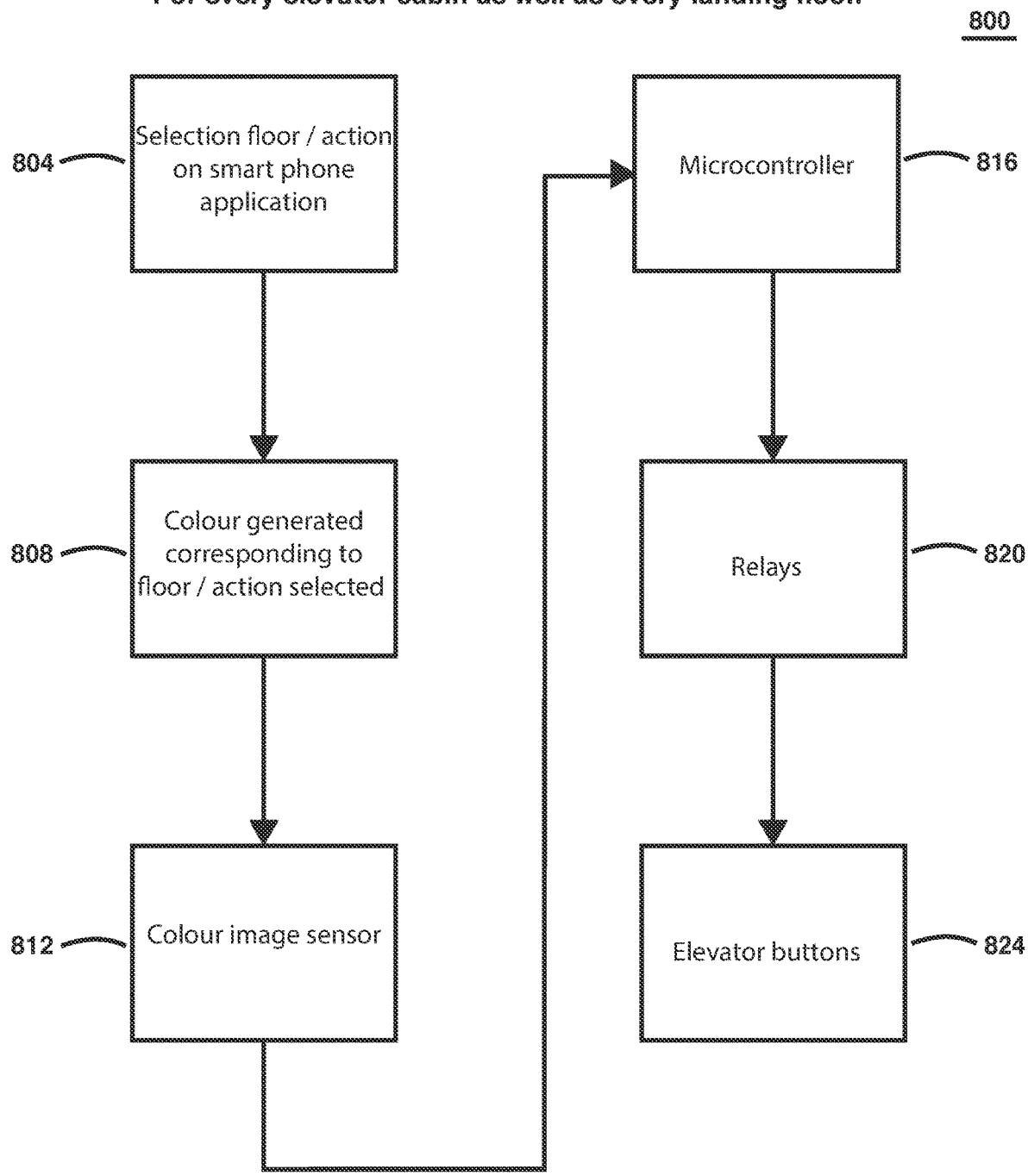
FIG. 8 is a block diagram depicting one embodiment of a colour-detection system for use with elevators.

Referring to FIG. 8, a flowchart illustrating one embodiment of process 800, which represents a basic operation of control system 10. In some embodiments, a user can enter a desired floor or elevator function on application 32 on smart device 24 at step 804. Application 32 can then generate colour code 34 unique to the elevator floor or function entered on virtual keyboard 26 to display on touchscreen display 25 at step 808. The user can then display colour code 34 to colour detector 16 (or 22) at step 812. Once colour code 34 has been detected by colour detector 16 or 22, the colour detector can then generate a first signal that can be relayed to a microcontroller at step 816 that, in turn at step 820, send an output signal to a relay mechanism, which can be operatively connected to the buttons of the elevator's control panel to electrically operate the elevator button that corresponds to the displayed colour code 34 at step 824.

Figure 9:
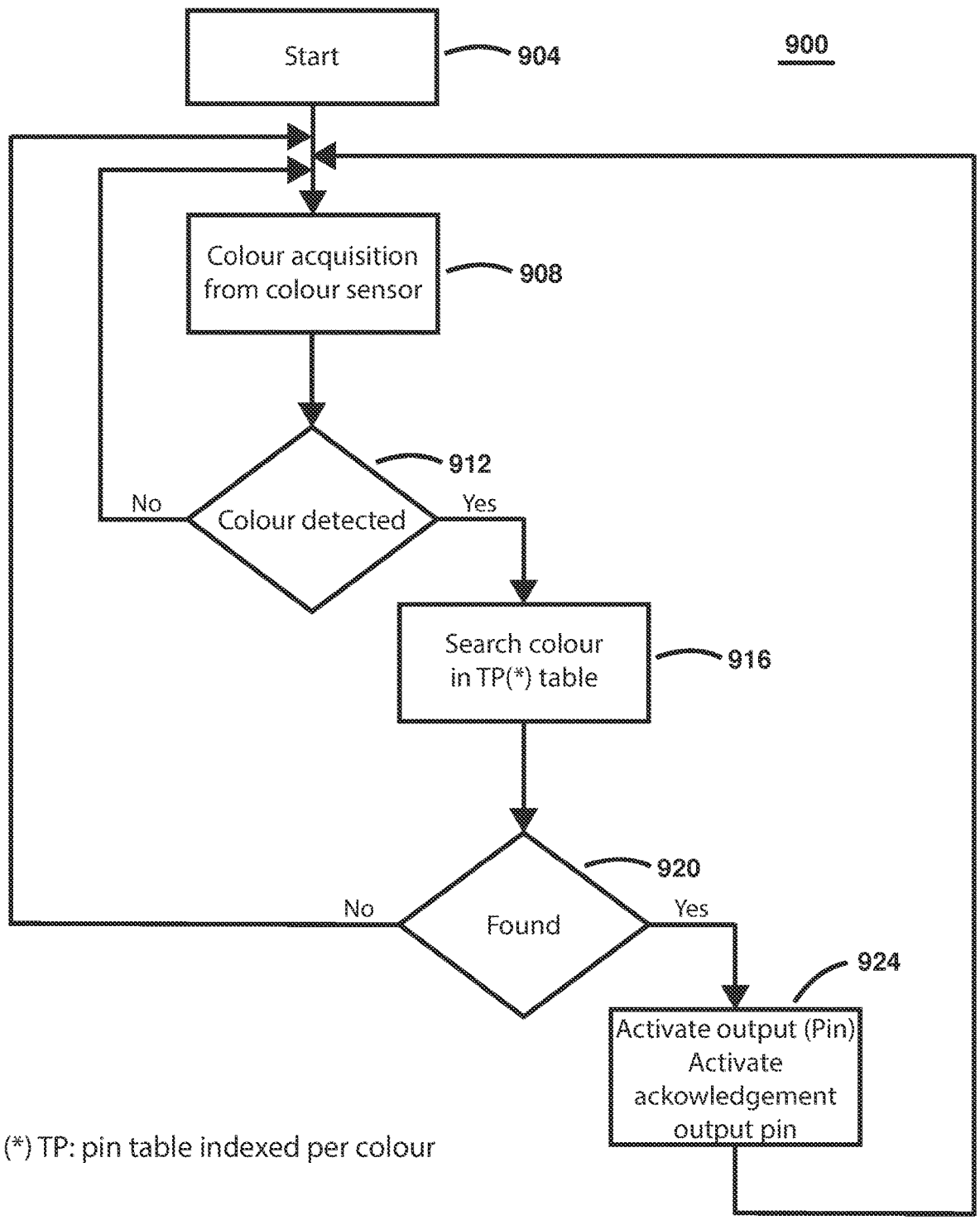
FIG. 9 is a flowchart depicting one embodiment of a microcontroller program operating on the microcontroller of the system of FIG. 8.

Referring to FIG. 9, a flowchart is shown representing one embodiment of process 900 followed by the microcontroller. In some embodiments, process 900 begins at step 904 where control system 10 is waiting for a colour code to be presented to a colour detector. Once a colour code 34 is presented to colour detector 16 or 22 at step 908, a decision can be taken at step 912. If no colour code 34 is detected by the colour detector, process 900 can return to step 904. If a colour code 34 is detected at step 912, process 900 can then search for the detected colour code in a colour table disposed in a memory of the microcontroller at step 916. Process 900 can then progress to decision step 920. If the detected colour code is not located in the colour table, process 900 can return to step 904. If the detected colour code is found in the colour table, the microcontroller can then activate the acknowledgement output pin corresponding to the detected colour code at step 924. Process 900 can then return to step 904.

Figure 10:
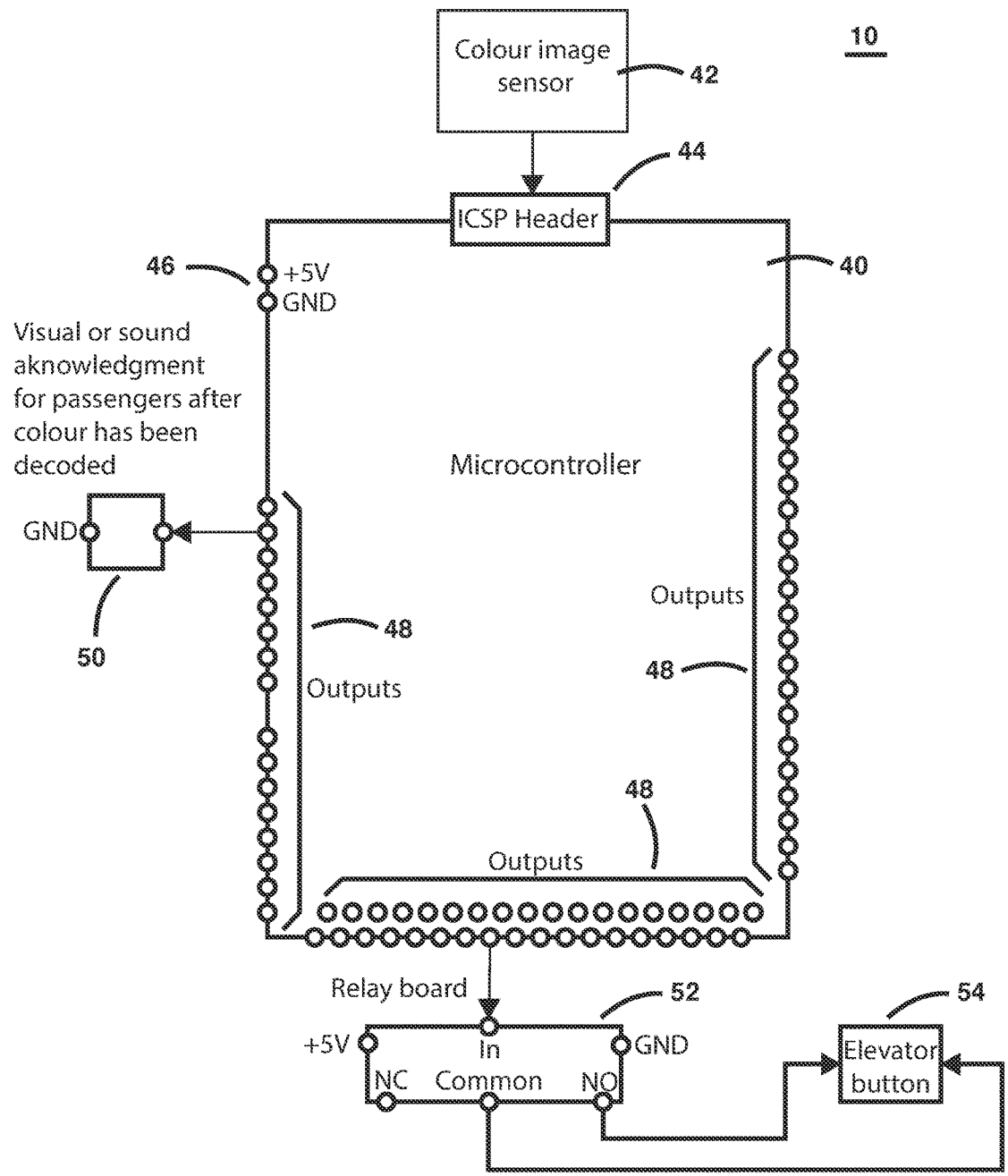
FIG. 10 is a block diagram schematic depicting one embodiment of the system of FIG. 8 for an elevator cabin that can access up to 40 floors.
Figure 11:
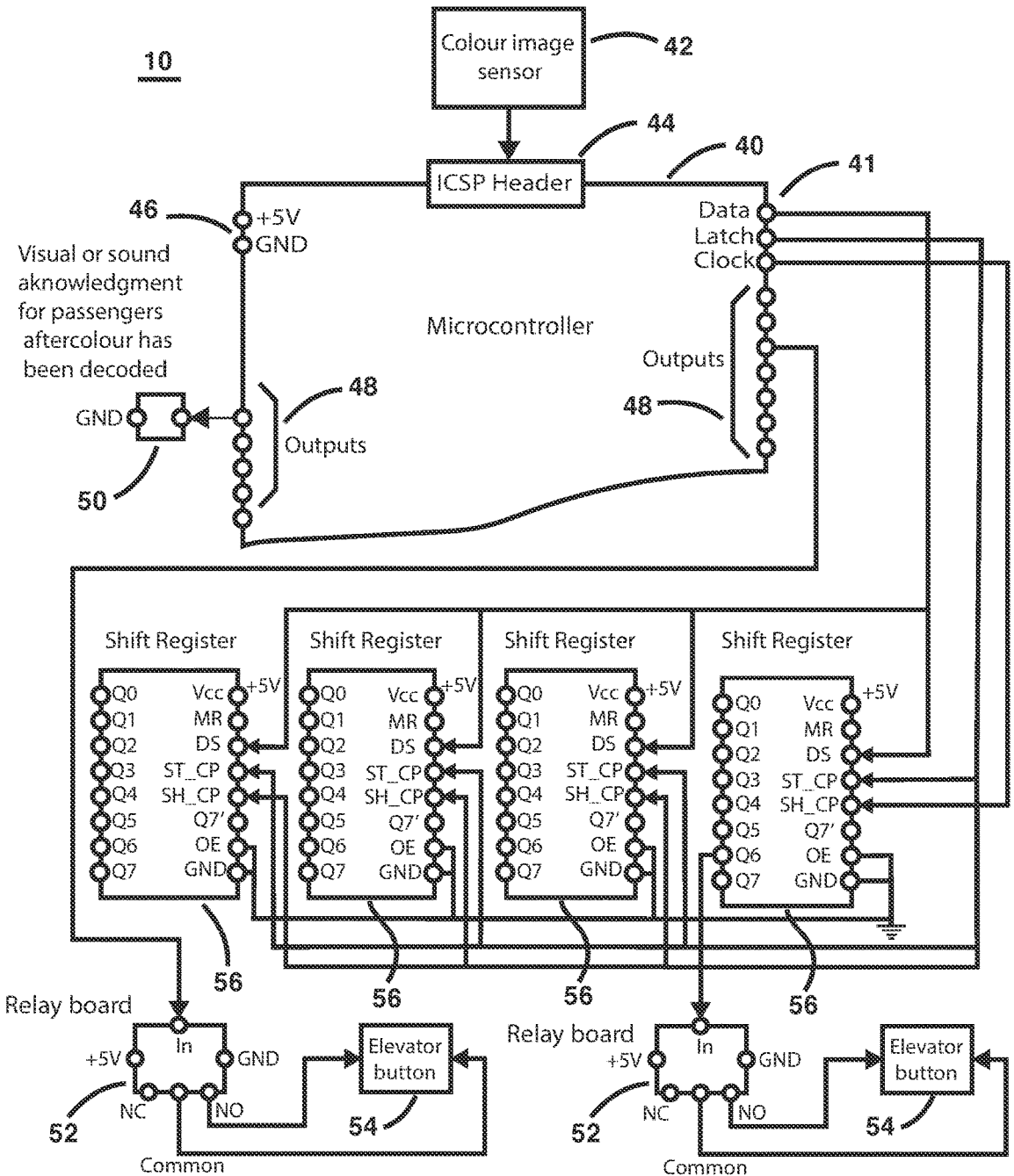
FIG. 11 is a block diagram schematic depicting one embodiment of the system of FIG. 8 for an elevator cabin that can access up to floors 41 and above.

Referring to FIG. 10, a block diagram is shown of one embodiment of control system 10. In some embodiments, control system 10 can comprise of microcontroller 40, which can comprise a model ATMega 2560 microcontroller as manufactured by Microchip Technology Inc. of Chandler, Arizona, USA. In some embodiments, the colour detector, shown as sensor 42, can be operatively coupled to microcontroller 40 via in-circuit serial programmer ("ICSP") header 44 as an input to microcontroller 40, which can be powered by a +5 volt dc power supply at terminals 46. In some embodiments, microcontroller 40 can comprise a plurality of programmable outputs 48, wherein at least one output 48 can operatively coupled to indicator 50, which can comprise one or both of a visual indicator (such as a light emitting diode or the like) and a audible indicator (such as a buzzer or speaker that can emit a programmed sound such as a chime). In some embodiments, one or more of outputs 48 can be operatively coupled to a relay mechanism or board 52, which can be configured to have its normally open contacts operatively attached to the contact leads of a particular elevator button 54. In the illustrated embodiment, relay board 52 can close its normally open contacts when receiving an output signal from an output 48 to emulate the closing of an elevator button switch circuit. In other embodiments, the normally closed contacts of relay board can be operatively attached to elevator button 54 such that its contacts open the normally closed contacts when receiving an output signal from an output 48. The representative embodiment shown in FIG. 10 can accommodate up to 40 floors in a building. To increase the number of floors that can be accommodated by control system 10, shift registers 56 can be used in combination with microcontroller 40 by coupling data, latch and clock leads 41 thereof to shift registers 56, as shown in FIG. 11. Each shift register 56 can then be operatively coupled its dedicated relay board 52, which can be further coupled to its dedicated elevator button 54.

Figure 12:
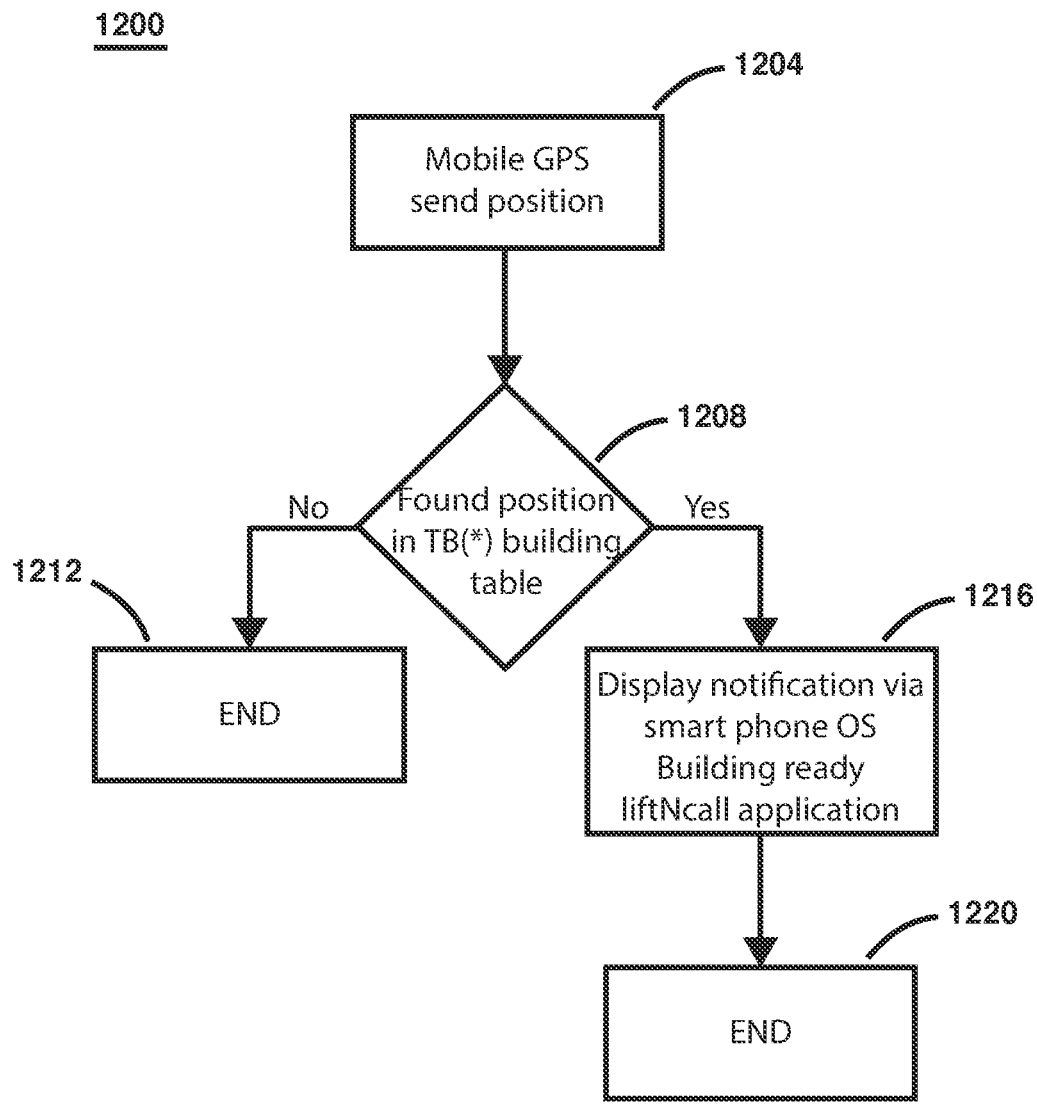
FIG. 12 is a flowchart depicting one embodiment of a software application for use with the smart phone of FIG. 5 to determine a GPS position of the smart phone.

In some embodiments, application 32 can implement the global positioning system ("GPS") features disposed on smart device 24. Referring to FIG. 12, a flowchart is shown representing one embodiment of process 1200 setting out this functionality. Process 1200 can start at step 1204 wherein application 32 can access the GPS position of smart device 24 and determine at decision step 1208 whether smart device 24 is located in a building having elevators that can operate with control system 10 by comparing the GPS position with a database of locations with building that can operate with control system 10. If the GPS position is not within the database, process 1200 ends at step 1212. If the GPS position is one that is found within the database, application 32 can display a notification on smart device 24 at step 1216 that control system 10 can be used at that location. Process 1200 can then stop at step 1220.

Figure 13:
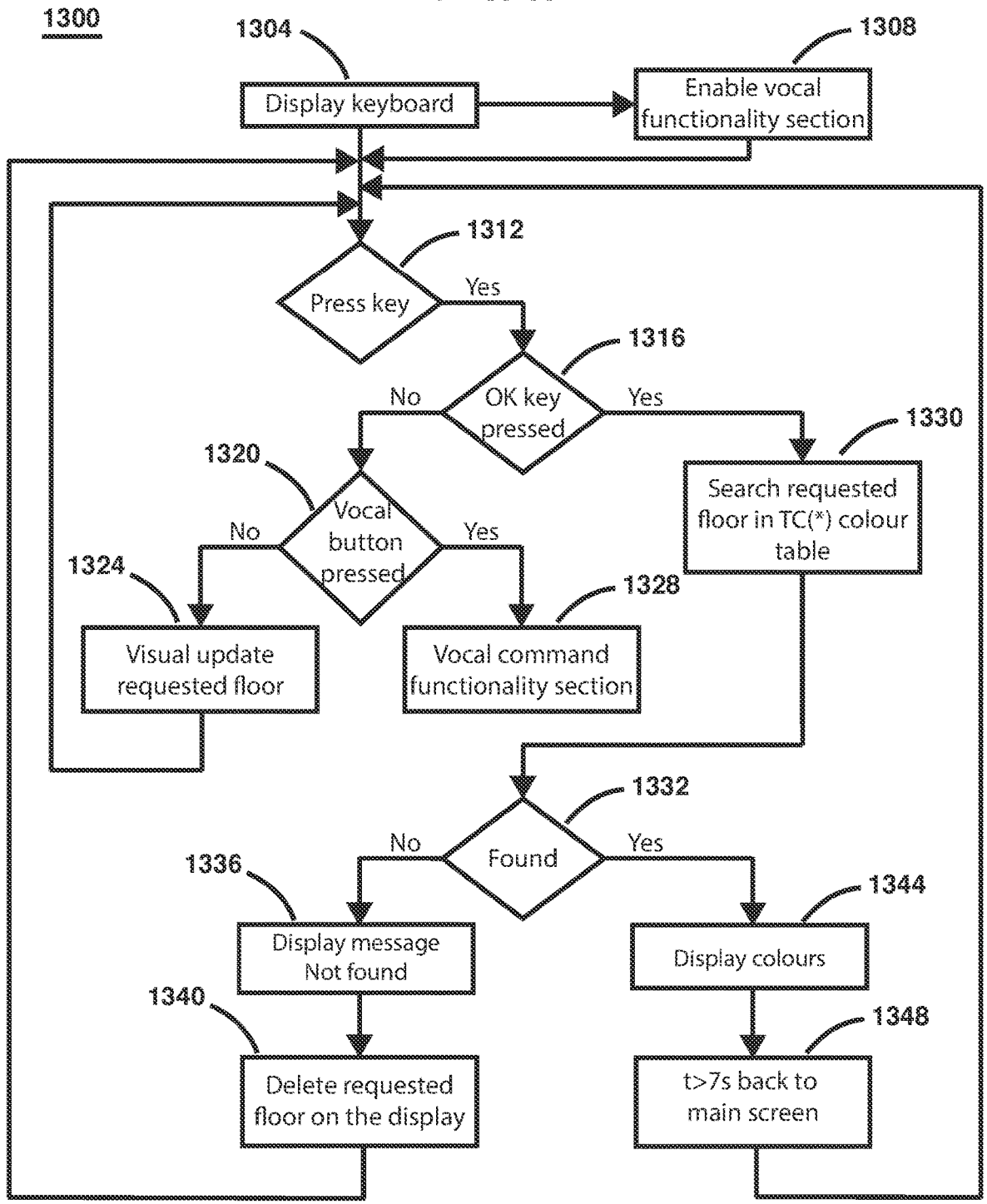
FIG. 13 is a flowchart depicting one embodiment of a main screen operation of a software application for use with the smart phone of FIG. 5.

Referring to FIG. 13, a flowchart is shown representing one embodiment of a main screen displayed by application 32 operating on smart device 24, herein referred to as process 1300. In some embodiments, process 1300 can start at step 1304 to display virtual keyboard 26 on touchscreen 25. Optionally, a user can enable vocal functionality of process 1300 at step 1308. A user can then press a key at step 1312. As an example, a user can press a desired floor number followed by the "OK" key or can press another key. At step 1316, a decision can be made. If the "OK" key was not pressed, process 1300 then determines whether the vocal button was pressed at step 1320. If not, a request is made to update requested floor at step 1324, which then returns process 1300 to step 1304. If the "OK" key was pressed at step 1316, a search is made at step 1330 of the requested floor in a colour table stored in a memory of the microcontroller. Process 1300 can then process to decision step 1332. If the requested floor is not found in the colour table, process 1300 then displays a "not found" message at step 1336 followed by deleting the requested floor from the touchscreen display at step 1340, which is followed by a return to step 1304. If the requested floor is found at step 1332, application 32 can then display unique colour code 34 on touchscreen display 25 at step 1344. Application 32 can then keep colour code 34 displayed for a period of time to allow the user to display colour code 34 to the colour detector. After a period of time greater than 7 seconds, application 32 can remove colour code 34 from the display at step 1348, upon which process 1300 can return to step 1304.

Figure 14:
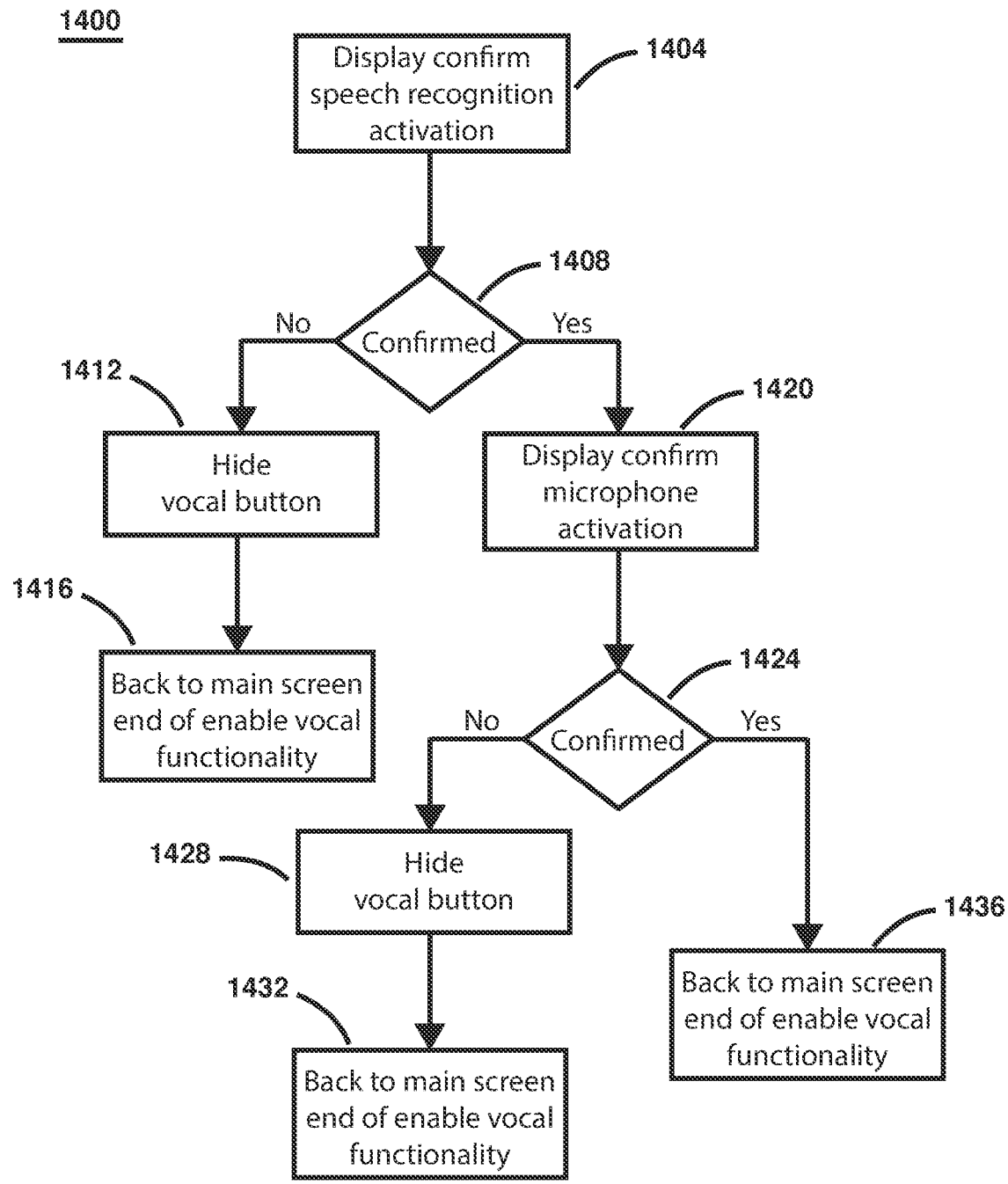
FIG. 14 is a flowchart depicting one embodiment of a software application for use with the smart phone of FIG. 5 to enable vocal functionality of the smart phone.

In some embodiments, application 32 can implement voice recognition techniques to enable vocal control thereof. Referring to FIG. 14, a flowchart is shown representing one embodiment of process 1400 carried out by application 32 on smart device 24 to enable vocal functionality. Process 1400 can start at step 1404 wherein application 32 can display confirmation of speech recognition activation. If the process to enable speech recognition is not confirmed at step 1408, process 1400 can then hide vocal button at step 1412 and then return to the main screen of application 32 at step 1416. If speech recognition is confirmed at step 1408, application 32 can display confirmation of same and activate the microphone of smart device 24 at step 1420. If this step is not confirmed at step 1424, process 1400 can hide the vocal button at step 1428 and then return to the main screen of application 32 at step 1432. If the decision at step 1424 is confirmed, process 1400 can then return to the main screen of application 32 at step 1436.

Figure 15:
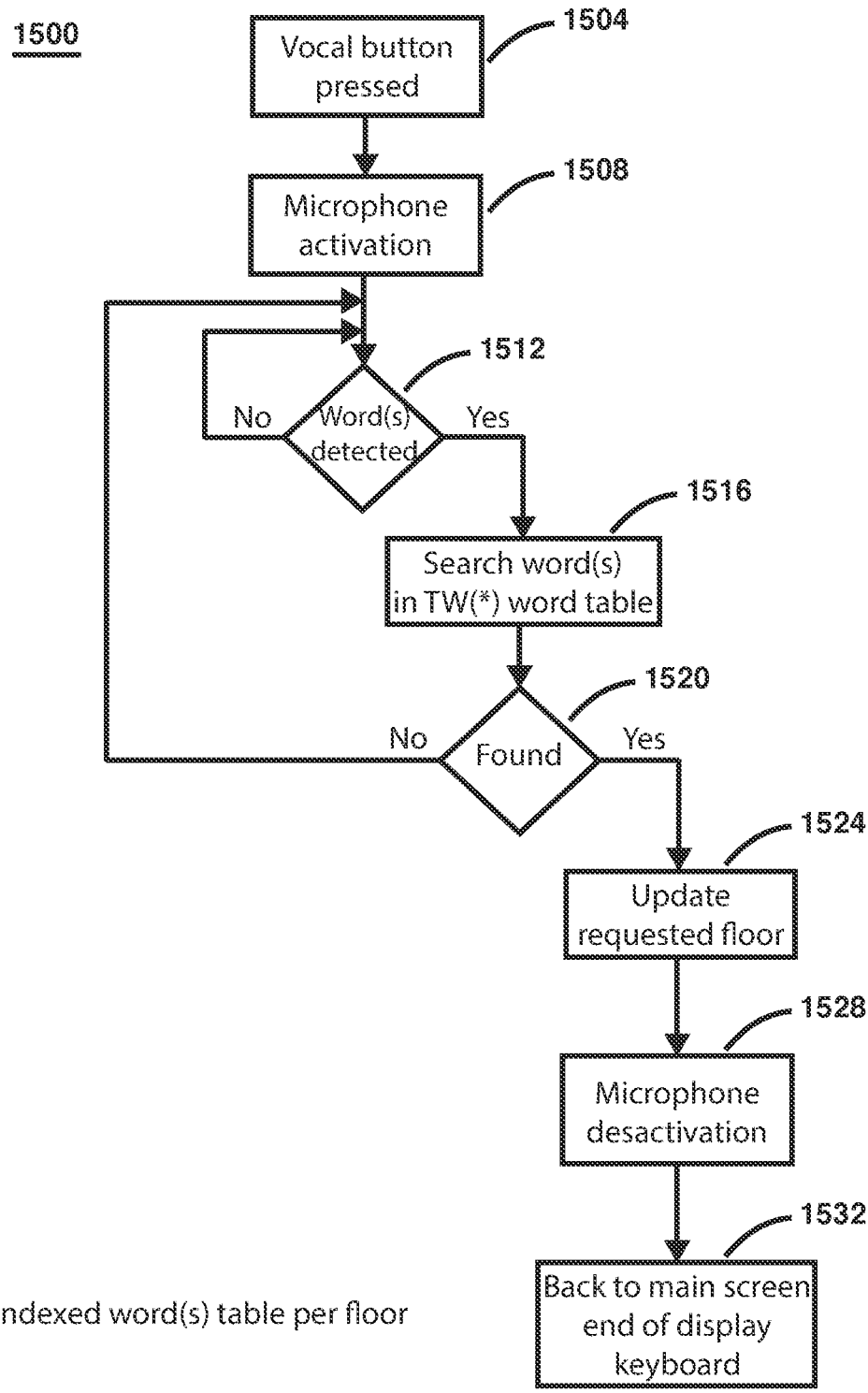
FIG. 15 is a flowchart depicting one embodiment of the vocal functionality of the software application of FIG. 14.

Referring to FIG. 15, a flowchart is shown representing one embodiment of process 1500 carried out by application 32 for the enablement of vocal functionality. In some embodiments, process 1500 can start at step 1504 when the vocal button is pressed, which can be followed by activation of the microphone on smart device 24 at step 1508. At step 1512, process 1500 can wait for a vocal command to be detected. If no vocal command is detected, step 1512 loops back to its beginning to wait for a detected vocal command. When a vocal command is detected, the detected word or command is searched in a word table disposed in a memory of microcontroller 40 at step 1516. If the detected word or command does not match an entry in the word table, process 1500 can return to step 1512. If the detected work or command does match an entry in the work table, process 1500 proceeds to interpret the word or command at 1524, for example, update the requested floor in application 32 where the corresponding unique colour code 34 for the requested floor can be displayed on touchscreen display 25. Next, process 1500 can then deactivate the microphone at step 1528 and then return to the main screen of application 32 at step 1532.

In some embodiments, control system 10 can activate one or both of the visual and audible indicators when smart device 24 enters into a building equipped with elevators that can operate with control system 10. The location of smart device 24 can be determined using the GPS coordinates of smart device 24 and comparing them with a database having the GPS coordinates of buildings equipped to work with control system 10. In some embodiments, control system 10 can activate one or both of the visual and audible indicators when a floor or other operative button function (such as alarm, door open/close, etc.) is selected.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A system for hands-free control of a control panel of an elevator, the system comprising:
   a) a colour detector configured for detecting a unique colour code comprised of a plurality of colours, the colour detector further configured to generate a first signal in response to the colour detector detecting the unique colour code;
   b) a microcontroller operatively coupled to the colour detector, the microcontroller configured to receive and decode the first signal to generate a predetermined output signal in response to the unique colour code, the microcontroller further configured to generate a plurality of unique predetermined output signals, one for each of the unique combination of the plurality of colours; and
   c) a plurality of relays operatively coupled to the microcontroller, wherein the system further comprises at least one relay for each of the plurality of the unique output signals, each of the plurality of relays configured to be operatively coupled to at least one button disposed on the control panel.

2. The system as set forth in claim 1, further comprising an indicator configured for providing an acknowledgement when the microcontroller has decoded the unique colour code.

3. The system as set forth in claim 2, wherein the indicator comprises one or both of a visual indicator and an audible indicator.

4. The system as set forth in claim 1, wherein the microcontroller comprises an in-circuit serial programmer ("ICSP") header and wherein the colour detector is operatively coupled to the ICSP header.

5. The system as set forth in claim 1, further comprising at least one shift register operatively coupled to the microcontroller, wherein the at least one shift register is disposed between the microcontroller and at least one of the plurality of relay boards.

6. The system as set forth in claim 1, further comprising a printed card comprising the unique colour code printed thereon.

7. The system as set forth in claim 1, further comprising a smart device configured to display the unique colour code on a touchscreen display disposed on the smart device.

8. The system as set forth in claim 7, wherein the smart device comprises an executable software application operatively disposed in a memory disposed therein, the executable software application comprising:
   a) a first code segment configured for displaying a virtual keyboard on the touchscreen display;
   b) a second code segment configured for detecting a key depressed on the virtual keyboard;
   c) a third code segment configured for looking up the unique colour code corresponding to the depressed key in a colour table disposed in a memory disposed on the smart device, the colour table comprising a plurality of colour codes; and
   d) a fourth code segment configured for displaying the unique colour code corresponding to the depressed key on the touchscreen display.

9. The system as set forth in claim 8, wherein the executable software application further comprises:
   a) a fifth code segment configured for enabling the software application to respond to vocal commands;
   b) a sixth code segment configured for enabling a microphone disposed on the smart device to respond to a vocal command;
   c) a seventh code segment configured for detecting at least one word spoken in the vocal command;
   d) an eighth code segment configured for searching for the detected at least one word in a word table disposed in the memory; and
   e) a ninth code segment configured for displaying the unique colour code corresponding to the detected at least one word on the touchscreen display if the detected at least one word is located in the word table.

10. The system as set forth in claim 7, wherein the executable software application further comprises a tenth code segment configured to determine where the elevator is located using a global positioning system disposed in the smart device.

11. A method for hands-free control of a control panel of an elevator the method comprising:
   a) displaying a unique colour code of a plurality of colours to a colour detector;
   b) generating a first signal in response to the unique colour code;

c) decoding the unique colour code to generate a unique predetermined output signal; and d) operating a relay in response to the unique predetermined output signal, the relay corresponding to the unique predetermined output signal, the relay operatively coupled to a button disposed on the control panel, the button corresponding to the unique predetermined output signal.

12. The method as set forth in claim 11, further comprising providing an acknowledgement when the unique colour code has been decoded.

13. The method as set forth in claim 12, wherein the acknowledgement comprises one or both of a visual indicator and an audible indicator.

14. The method as set forth in claim 11, further comprising displaying the unique colour code with a printed card comprising the unique colour code printed thereon.

15. The method as set forth in claim 11, further comprising displaying the unique colour code with a smart device configured to display the unique colour code on a touchscreen display disposed on the smart device.

16. The method as set forth in claim 15, further comprising:
   a) displaying a virtual keyboard on the touchscreen display;
   b) depressing a key on the virtual keyboard;
   c) looking up the unique colour code corresponding to the depressed key in a colour table; and
   d) displaying the unique colour code corresponding to the depressed key on the touchscreen display.

17. The method as set forth in claim 16, further comprising:
   a) enabling the smart device to receive vocal commands;
   b) detecting at least one word spoken in a vocal command using a microphone disposed on the smart device;
   c) searching for the detected at least one word in a word table; and
   d) displaying the unique colour code corresponding to the detected at least one word on the touchscreen display if the detected at least one word is located in the word table.

18. The method as set forth in claim 15, further comprising determining the location of the elevator using a global positioning system disposed in the smart device.

* * * * *